3,445,257
HARDENER FOR WATER GLASS CEMENTS
Albert Hloch and Rudolf Kohlhaas, Frankfurt am Main, and Nikolay Medic and Helmut Neises, Kelkheim, Taunus, Germany, assignors to Farbwerke Hoechst Aktiengesellschaft vormals Meister Lucius & Bruning, Frankfurt am Main, Germany, a corporation of Germany
Filed May 18, 1965, Ser. No. 456,757
Claims priority, application Germany, May 21, 1964, F 42,932
Int. Cl. C09c 1/64, 1/40; C08k 1/82
U.S. Cl. 106—84        3 Claims

ABSTRACT OF THE DISCLOSURE

An improved process has been provided for hardening water glass cements which comprises employing as a hardener a condensed aluminum phosphate prepared by subjecting acid aluminum phosphate consisting essentially of $P_2O_5$ and $Al_2O_3$ in a ratio within the range of 1.1 to 3 to a two-stage thermal treatment during the first stage of which, the acid aluminum phosphate is heated to a temperature of less than about 400° C. until the weight of said acid aluminum phosphate remains constant and during the second stage of which, the acid aluminum phosphate is heated to a temperature of less than about 750° C. until the weight of said acid aluminum phosphate remains constant.

---

Figure 1:
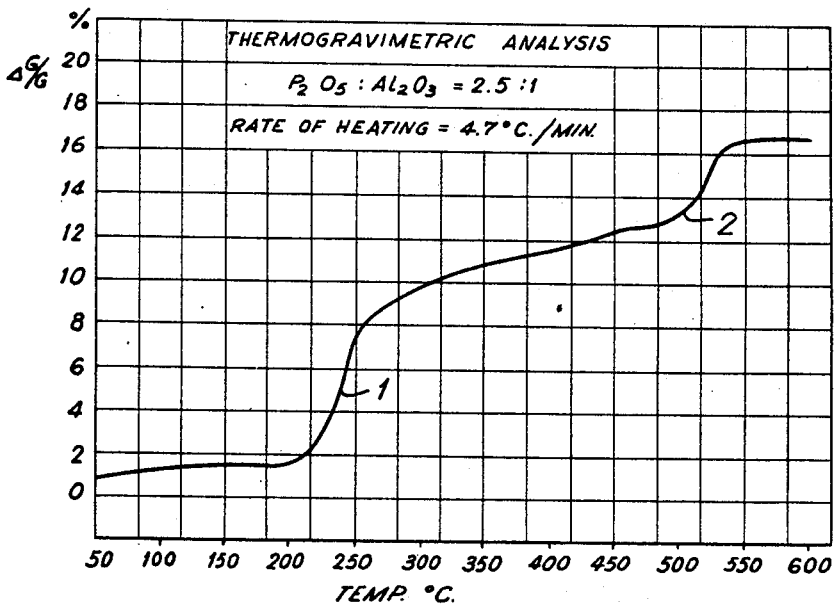

The present invention provides a hardener for water glass cements.

In the construction of chemical apparatus and furnaces cement masses containing water glass as a binder have found a wide use. These cement masses are formed of a filler that is resistant to acids or to high temperatures, for example, quartz sand, barium sulphate or chamotte, an alkali silicate, for example, potash water glass, and a hardener which brings about the hardening of the cement masses by the separation of silica gel.

Up to now alkali silicofluorides have been the most often used hardeners. However, these have considerable disadvantages. Under the action of an acid, these silicofluorides give off hydrogen fluoride whereby the liquids which come into contact with the linings of the apparatus are contaminated and, moreover, not only metals but also the mineral linings themselves are corroded.

The alkali and the fluorine introduced by the alkali silicofluorides reduce the resistance to high temperatures of refractory cements which contain predominantly chamottes as fillers.

It has been proposed to eliminate these disadvantages by replacing the silicofluoride used as a hardener by an organic hardener, especially by an amide or an ester of a fatty acid of low molecular weight. Products of this kind, too, have been used without satisfying, however, all the requirements.

It has also been proposed to use stoichiometrically acid phosphates which do not have an alkaline reaction as hardeners for water glass cements. However, these phosphates are not widely used in practice because the cement masses prepared for use do not have a sufficient pot life.

Now we have found that the aforesaid disadvantages can be avoided by using as a hardener for water glass cements a condensed aluminium phosphate obtained by subjecting an acid aluminum phosphate containing $P_2O_5$ and $Al_2O_3$ in a ratio within the range of 1.1 to 3, preferably 2 to 3, to a thermal treatment in the first stage of which the compound is heated to at most 400° C. until its weight remains constant and in the second stage of which the compound is heated to at most 700° C., again until its weight remains constant.

Water glass cements which, according to the invention, contain a condensed aluminium phosphate as a hardener are waterproof immediately after hardening whereas the water glass cements which are hardened by means of alkali silicofluoride or organic hardeners become waterproof after repeated acidification only. The use of the condensed aluminium phosphates according to the invention as hardeners also brings about a considerable increase of the resistance of the cements to mineral acids. Besides, the attack of strong mineral acids does not lead to the splitting off of detrimental or aggressive substances as is the case when silicofluorides are used.

The cements may be prepared from potash or soda water glasses in which the ratio of $SiO_2$ to $Me_2O$ may vary within wide limits, for example, within the range of about 1.5 to 4.0. The higher the concentration of the water glasses the higher the strength of the cements obtained. In general it is advantageous that the cements contain 25 to 30 parts of water glass and 90 to 100 parts of filler per 4 parts of hardener. Suitable fillers are the materials that are generally used for this purpose, for example, silicon dioxide in its various crystallographic forms such as quartz or christobalit, aluminium silicates such as kaolin and clays, silicon carbides or heavy spar. Which filler or mixture of fillers is to be used depends on the purpose for which the water glass cements are to be used.

The condensed aluminium phosphates used as hardeners for water glass cements according to the invention are prepared from aluminium ortho phosphates which contain $P_2O_5$ and $Al_2O_3$ in a ratio within the range of 1.1 to 3 and which are prepared in known manner, for example, by introducing the hydrate of alumina or alumina gel into phosphoric acid, evaporating resulting solution and drying the phosphate obtained. According to the invention the aluminium ortho phosphates are subjected to a stepwise thermal treatment. They are first heated to at most 400° C. until their weight remains constant and then to at most 750° C., likewise until their weight remains constant. The lower limit of the range of temperature at which the phosphates are treated is at about 200° C. and depends on the composition of the aluminium ortho phosphate used. It can easily be determined by a thermogravimetric or differential thermal analysis.

In the first stage of the thermal treatment the temperature must not exceed 400° C. before the weight remains constant. For if the condensation is carried out by heating the phosphates directly to a temperature above 400° C., that is to say by eliminating the first stage of the thermal treatment, the compounds obtained cannot be used as hardeners.

The thermal treatment may be carried out batchwise or continuously, for example, in a rotary tubular furnace.

Figure 2:
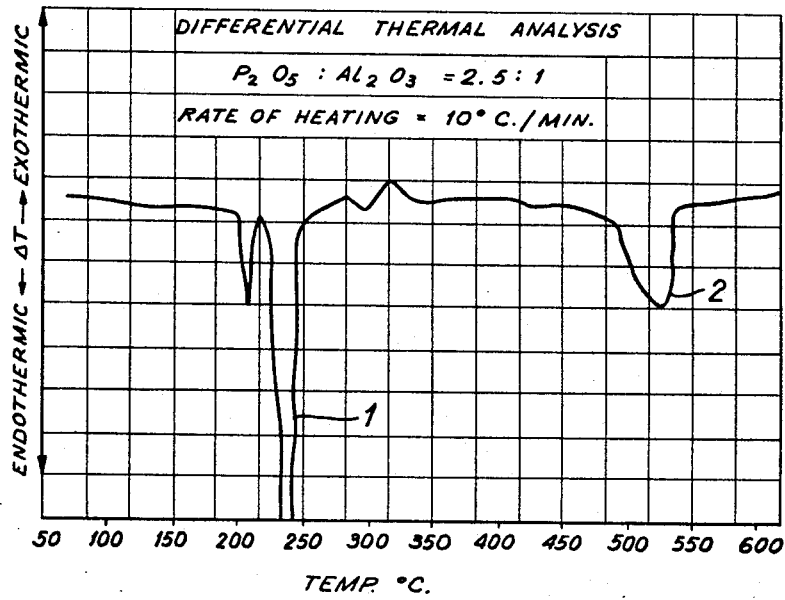

Some values relating to the thermal treatment are illustrated by the curves shown in FIGURES 1 and 2 of the accompanying drawings. The curve shown in FIGURE 1 is based on the values obtained by the thermogravimetric analysis and the curve shown in FIGURE 2 is based on the values obtained by the differential-thermal analysis. In either of the curves reference numerals 1 and 2 point to the changes in the course of the curves which are due to a loss of weight brought about by the elimination of water and which are characterized by an endothermic reaction. The above examinations were carried out with an aluminium ortho phosphate containing $P_2O_5$ and $Al_2O_3$ in a ratio of 2.5.

The following examples which are not intended to limit the invention serve to illustrate the preparation of the hardener for water class cements according to the invention.

EXAMPLE 1

320 grams of the hydrate of alumina containing 64 to 65% of $Al_2O_3$ were suspended in 250 cc. of water. The resulting suspension was slowly introduced, while stirring, into 1300 grams of preheated phosphoric acid containing 55% of $P_2O_5$, whereby the hydrate of alumina was dissolved with the evolution of heat. The clear solution which formed was evaporated until it began to become turbid. The removal of water was continued by heating the solution for 48 hours to a temperature within the range of 170° to 200° C. It would also have been possible to carry out the drying in a spray drier or a drum drier. The dried product was ground into coarse particles and then first heated for 2½ hours to a temperature within the range of 350° to 450° C., on an average to a temperature of about 400° C., and then for another 2½ hours to a temperature within the range of 500° to 600° C., on an average to about 550° C. After having been cooled the finished hardener was finely ground.

EXAMPLE 2

This example is to demonstrate that the thermal treatment can also be carried out by means of a continuously operating apparatus, for example, a rotary tubular furnace.

18.2 kg. of the hydrate of alumina containing 64% of $Al_2O_3$ were suspended in about 25 litres of water and introduced in small portions, while stirring continuously, into 74 kg. of phosphoric acid which contained 55% of $P_2O_5$ and which had been preheated to about 90° to 100° C. The resulting solution which had a temperature of about 80° to 90° C. was freed from water in a spray drier, the through-put being 7 to 9 litres per hour. 550 to 600 cubic metres (measured at N.T.P.) per hour of air at 210° to 260° C. were introduced into the drier. At the place where the air entered the apparatus the temperature was within the range of 180° to 220° C. By operating in this manner about 62 kg. of a crystalline product having a total content of water of 16% (crystal water and chemically bound water, determined by the loss on heating at 800° C.). The product was further dried at a temperature within the range of 220° to 260° C. until the content of water (determined by the loss on heating) was within the range of 6 to 8%. (This drying operation can be carried out, for example, in a shelf drier, a truck drier, a belt-type drier or a rotary drum drier.) During this operation a slight sintering set in. Subsequently the thermal treatment was carried out in a rotary tubular furnace having a length of 1.5 metres. 3.5 to 4 kg. of material were put through per hour. About 1 kg. of material was always present in the furnace. The heating was adjusted in such a manner that approximately the following temperatures prevailed in the different parts of the furnace:

First third of the furnace: 300° to 400° C.;
Second third of the furnace: 400° to 500° C.; and
Outlet of the furnace: 600°.

The products obtained by the experiments described in Examples 1 and 2 had the following composition:

77.2% of $P_2O_5$,
22.4% of $Al_2O_3$,
0.4% loss on heating.

The products were not hygroscopic and when stored their hardening properties were not impaired.

Figure 3:
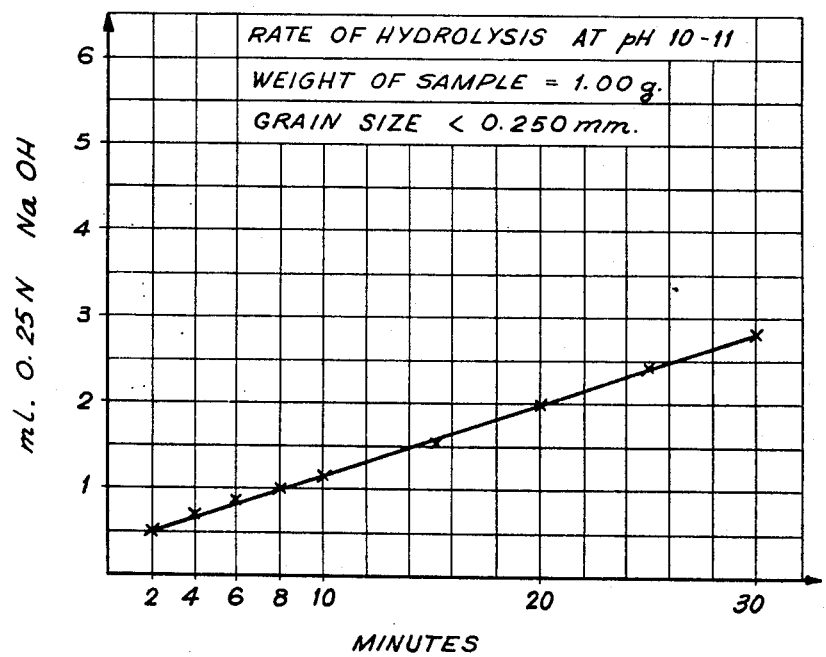

As can be seen from FIG. 3, the curve representing the hydrolysis of the condensed aluminium phosphate obtained according to Examples 1 and 2 and a pH of 10 to 11 is nearly linear for the first 30 minutes. For the purpose of determining the rate of hydrolysis 1 gram of the product was suspended in water and the resulting suspension was adjusted to a pH of 10 to 11 by means of sodium hydroxide solution. The said pH value was maintained by the automatic addition of 0.25 N-sodium hydroxide solution. FIG. 3 demonstrates the addition of 0.25 N-sodium hydroxide solution as a function of time.

EXAMPLE 3

A hardener containing $P_2O_5$ and $Al_2O_3$ in a ratio of 3 was prepared in the manner described in Example 1 but instead of the hydrate of alumina the equivalent amount of an alumina gel of the formula $Al_2(OH)_5Cl$ was used for the preparation of the aluminium ortho phosphate.

With the use of the aluminum phosphate prepared according to Examples 1 and 2 a water glass cement was prepared in the following way:

96 parts by weight of a quartz sand containing 3% of particles having a diameter of more than 0.15 mm., 61% of particles having a diameter within the range of 0.15 to 0.125 mm. and 36% of particles having a diameter of less than 0.125 mm. were intimately mixed with 4 parts by weight of hardener. 30 parts by weight of potash water glass containing $K_2O$ and $SiO_2$ in a ratio of 1:1.88 and having a density of 1.42 were added and the mixture was stirred well. The resulting cement had a pot life of 30 minutes and then hardened within 24 hours, forming a mass that was resistant to acids and water.

The following Table I collates the mechanical and chemical properties of the cement prepared with a hardener according to the invention and those of commercially available cements which had been hardened by means of an amide of an organic acid and a silicofluoride, respectively.

TABLE I

| | Commercially available cement | Cement containing the hardener according to the invention |
|---|---|---|
| Compressive strength after a storage of 8 days: | | |
| In the air | 186 kg./cm.² [1] | 310 kg./cm.² |
| In water | Destroyed [1] | 240 kg./cm.² |
| in $H_2SO_4$ of 96% strength | do.² | 280 kg./cm.² |
| Adhesion to iron after a storage of 8 days in the air | 15 kg./cm.² [1] | 19 kg./cm.² |
| Adhesion to ceramic stone immediately after hardening, in the air | 30 kg./cm.² [1] | 25 kg./cm.² |
| In $H_2SO_4$ of 96% strength: | | |
| After 8 days | Adhesion lost | 14 kg./cm.² |
| After 4 weeks | do | 15 kg./cm.² |

[1] Containing an organic hardener.
[2] Containing silicofluoride as a hardener.

For further examination cement masses containing various water glasses and the hardener according to the invention were prepared. The composition of the cement masses and the results of the examination can be seen from Table II given below. For the purpose of comparison a commercially available acid-proof cement containing an organic hardener was examined. The water glasses used had the following characteristic values:

| | A<br>$K_2O$ 14.5% | B<br>$Na_2O$ 7.5% | C<br>$K_2O$ 11.2% |
|---|---|---|---|
| $SiO_2$ | 27.2% | 25.5% | 24.5% |
| Density | 1.42 | 1.33 | 1.32 |
| $SiO_2/Me_2O$ | 1.88 | 3.4 | 2.2 |
| Viscosity at 20° C | 50 cP | 38 cP | 45 cP |

As can be seen from the following Table II the cements prepared with the use of the hardener according to the invention were resistant to water without having been subjected to an aftertreatment whereas the cement containing an organic hardener was waterproof only after having been acidified several times after hardening. The latter also applies to cements containing an alkali silicofluoride as a hardener.

of which, the acid aluminum phosphate is heated to a temperature of less than about 750° C. until the weight of said acid aluminum phosphate remains constant.

TABLE II

| Test specimen having the form of a cylinder of 25 mm. x 25 mm. | Commercially available acid-proof cement containing an organic hardener: 100 g. of cement powder, 36 g. of water glass A, pot life 45 minutes | Cement powder containing a hardener according to Example 3 ($P_2O_5$:$Al_2O_3$=3) (95 g. of a sand mixture, 5 g. of hardener), 100 g. of cement powder, 25 g. of water glass A, pot life 45 minutes, period of hardening 24 hours | Cement powder containing a hardener according to Examples 1 and 2 ($P_2O_5$:$Al_2O_3$=2.5) | | |
|---|---|---|---|---|---|
| | | | 100 g. of cement powder (96 g. of a sand mixture, 4 g. of hardener), 28 g. of water glass A, pot life 50 mins., period of hardening 24 hours | 100 g. of cement powder (96 g. of a sand mixture, 4 g. of hardener), 27 g. of water glass B, pot life 50 mins., period of hardening 24 hours | 100 g. of cement powder (97 g. of a sand mixture, 3 g. of hardener), 27 g. of water glass C, pot life 50 mins., period of hardening 24 hours |
| Compressive strength in the cold after a storage in the air of— | | | | | |
| 8 days | 175 kg./cm.² | 258 kg./cm.² | 157 kg./cm.² | 138 kg./cm.² | 105 kg./cm.² |
| 4 weeks | 250 kg./cm.² | 340 kg./cm.² | 336 kg./cm.² | 250 kg./cm.² | 200 kg./cm.² |
| Adhesion to iron (measured as tensile strength in the cold) after a storage in the air of— | | | | | |
| 8 days | 12.4 kg./cm.² | 17.9 kg./cm.² | 14.1 kg./cm.² | 12.1 kg./cm.² | 12.1 kg./cm.² |
| 4 weeks | 15 kg./cm.² | 24 kg./cm.² | 13.9 kg./cm.² | 13 kg./cm.² | Do. |
| Adhesion to ceramic stone (measured as tensile strength in the cold) after a storage in the air— | | | | | |
| Of 8 days | 25 kg./cm.² | 23.6 kg./cm.² | 16.7 kg./cm.² | 15.0 kg./cm.² | 16.5 kg./cm.² |
| Of 4 weeks | 30 kg./cm.² | 30 kg./cm.² | 20.6 kg./cm.² | 18.6 kg./cm.² | 14.8 kg./cm.² |
| Of 14 days, ageing for 16 hours at 90° C. and subsequent storage for 6 weeks in $H_2SO_4$ of 70% strength, at 20° C. | 10 kg./cm.² | 20 kg./cm.² | 14.5 kg./cm.² | 13.4 kg./cm.² | 3.8 kg./cm.² |
| Of 14 days and subsequent storage for 6 weeks in $H_2SO_4$ of 70% strength. | Destroyed | do | 14.4 kg./cm.² | 14.0 kg./cm.² | 6.4 kg./cm.² |
| Compressive strength in the cold of the test specimens after a storage of 8 days and subsequent boiling in drinking water for 8 hours. | do | 205 kg./cm.² | 141 kg./cm.² | 147 kg./cm.² | 114 kg./cm.² |

What we claim is:

1. In the process for hardening a water glass cement comprising water glass and filler to which is added and admixed a hardener therefor and the mixture is hardened, wherein the improvement comprises adding as a hardener to the cement to harden the same in a ratio of about 6.2 to 7.5:1 water glass to hardener a condensed aluminum phosphate prepared by subjecting acid aluminum phosphate consisting essentially of $P_2O_5$ and $Al_2O_3$ in a ratio within the range of 1.1 to 3 to a two-stage thermal treatment during the first stage of which, the acid aluminum phosphate is heated to a temperature of less than about 400° C. until the weight of said acid aluminum phosphate remains constant and during the second stage of which, the acid aluminum phosphate is heated to a temperature of less than about 750° C. until the weight of said acid aluminum phosphate remains constant.

2. In the process for hardening water glass cement according to claim 1 wherein the acid aluminum phosphate consists essentially of $P_2O_5$:$Al_2O_3$ within the range of 2 to 3.

3. In the process for hardening water glass cement according to claim 1 wherein the acid aluminum phosphate is an aluminum orthophosphate having a $P_2O_5$ and $Al_2O_3$ ratio of 2.5.

References Cited

FOREIGN PATENTS 449,983   7/1948   Canada.

JAMES E. POER, *Primary Examiner.*